(12) United States Patent
Stanev

(10) Patent No.: US 11,341,504 B1
(45) Date of Patent: May 24, 2022

(54) REALTIME FINANCIAL TRANSACTION APPROVAL

(71) Applicant: NortonLifeLock Inc., Tempe, AZ (US)

(72) Inventor: Radoslav Stanev, Tehachapi, CA (US)

(73) Assignee: NortonLifeLock Inc., Tempe, AZ (US)

( * ) Notice: Subject to any disclaimer, the term of this patent is extended or adjusted under 35 U.S.C. 154(b) by 26 days.

(21) Appl. No.: 16/368,203

(22) Filed: Mar. 28, 2019

(51) Int. Cl.
*G06Q 20/42* (2012.01)
*G06Q 20/40* (2012.01)

(52) U.S. Cl.
CPC .......... *G06Q 20/42* (2013.01); *G06Q 20/405* (2013.01)

(58) Field of Classification Search
CPC ....... G06Q 20/42; G06Q 20/405; G06Q 30/00
See application file for complete search history.

(56) References Cited

U.S. PATENT DOCUMENTS

| | | | | |
|---|---|---|---|---|
| 5,708,422 A | * | 1/1998 | Blonder | G06Q 20/40 340/5.41 |
| 5,991,750 A | * | 11/1999 | Watson | G06Q 20/00 705/2 |
| 5,999,596 A | * | 12/1999 | Walker | G06Q 20/04 235/380 |

OTHER PUBLICATIONS

Apple Pay, https://www.apple.com/apple-pay/. Accessed May 1, 2019.
Google Pay, https://pay.google.com. Accessed May 1, 2019.
Paypal, https://www.paypal.com/us/home. Accessed May 1, 2019.

* cited by examiner

*Primary Examiner* — Bennett M Sigmond
*Assistant Examiner* — Marla Hudson
(74) *Attorney, Agent, or Firm* — Holland & Hart LLP

(57) ABSTRACT

A method for approving financial transactions is described. In one embodiment, the method may include receiving, from a transaction interface, a transaction request to approve a financial transaction, determining a payment method of the financial transaction is associated with a regulated account, transmitting, based at least in part on the determining the payment method of the financial transaction is associated with the regulated account, an approval request to approve the financial transaction to a first administrator associated with the regulated account, and upon receiving a response to the approval request, transmitting to the transaction interface a transaction response message indicating whether the financial transaction is approved.

20 Claims, 8 Drawing Sheets

REALTIME FINANCIAL TRANSACTION APPROVAL

BACKGROUND

Parents have somewhat limited options for controlling purchases and other financial transactions made by their children. Certain banks may approve and issue payment cards to minors, however the charging protections may be limited to basic protections such as implementing a low credit limit, etc. In each instance, there may be little control over how the children make purchases, where unpermitted purchases may be dealt with after the fact. Accordingly, a system for improving current financial transaction models may be desirable.

SUMMARY

According to at least one embodiment, a method for approving financial transactions is described. In one embodiment, the method may include receiving, from a transaction interface, a transaction request to approve a financial transaction, determining a payment method of the financial transaction is associated with a regulated account, transmitting, based at least in part on the determining the payment method of the financial transaction is associated with the regulated account, an approval request to approve the financial transaction to a first administrator associated with the regulated account, and upon receiving a response to the approval request, transmitting to the transaction interface a transaction response message indicating whether the financial transaction is approved.

In some examples, the method may include determining whether a predetermined condition or a set of predetermined conditions associated with the financial transaction are satisfied based at least in part on a policy associated with the regulated account and upon determining that the predetermined condition or the set of predetermined conditions associated with the financial transaction are satisfied, transmitting to the transaction interface the transaction response message indicating an approval of the financial transaction without transmitting the approval request to the first administrator. In some examples, upon determining that the predetermined condition or set of predetermined conditions associated with the financial transaction are not satisfied, the method may include transmitting the approval request to at least the first administrator before transmitting the transaction response message to the transaction interface.

In some examples, the predetermined condition or set of predetermined conditions comprises a time of day, a geographical location, a category of merchandise, a seller, an amount of the financial transaction, a quantity of financial transactions made or attempted in a given time period, a monetary amount of financial transactions made in a given time period, or a combination thereof. In some examples, the method may include sending the approval request to a second administrator and initiating a timer upon transmitting the approval request. In some examples, upon determining the response to the approval request is received from the first administrator or the second administrator within a predetermined amount of time of transmitting the approval request, the method may include configuring the transaction response message to include an indication identified in the response to the approval request, wherein the indication in the response to the approval request indicates an approval or denial of the financial transaction.

In some examples, upon determining no response is received from the first administrator or the second administrator within the predetermined amount of time, the method may include transmitting to the transaction interface the transaction response message indicating a denial of the financial transaction. In some examples, the method may include identifying a subscription associated with the financial transaction and combining a subscription request with the approval request to request approval of a plurality of subsequent charges associated with the financial transaction. In some examples, the method may include receiving a response message from the first administrator that includes an approval of the financial transaction and an approval of the plurality of subsequent charges associated with the financial transaction.

In some examples, the method may include receiving a subscription charge request from the transaction interface to approve a subsequent charge from the plurality of subsequent charges and automatically approving the subscription charge request based at least in part on approval of the plurality of subsequent charges associated with the subscription. In some examples, the transaction interface includes a physical point of sale, an automated teller machine (ATM), or an online point of sale.

A computing device configured for approving financial transactions is also described. The computing device may include one or more processors and memory in electronic communication with the one or more processors. The memory may store computer executable instructions that when executed by the one or more processors cause the one or more processors to perform the steps of receiving, from a transaction interface, a transaction request to approve a financial transaction, determining a payment method of the financial transaction is associated with a regulated account, transmitting, based at least in part on the determining the payment method of the financial transaction is associated with the regulated account, an approval request to approve the financial transaction to a first administrator associated with the regulated account, and upon receiving a response to the approval request, transmitting to the transaction interface a transaction response message indicating whether the financial transaction is approved.

A computer-program product for approving financial transactions is also described. The computer-program product may include a non-transitory computer-readable medium storing instructions thereon. When the instructions are executed by one or more processors, the execution of the instructions may cause the one or more processors to perform the steps of receiving, from a transaction interface, a transaction request to approve a financial transaction, determining a payment method of the financial transaction is associated with a regulated account, transmitting, based at least in part on the determining the payment method of the financial transaction is associated with the regulated account, an approval request to approve the financial transaction to a first administrator associated with the regulated account, and upon receiving a response to the approval request, transmitting to the transaction interface a transaction response message indicating whether the financial transaction is approved.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
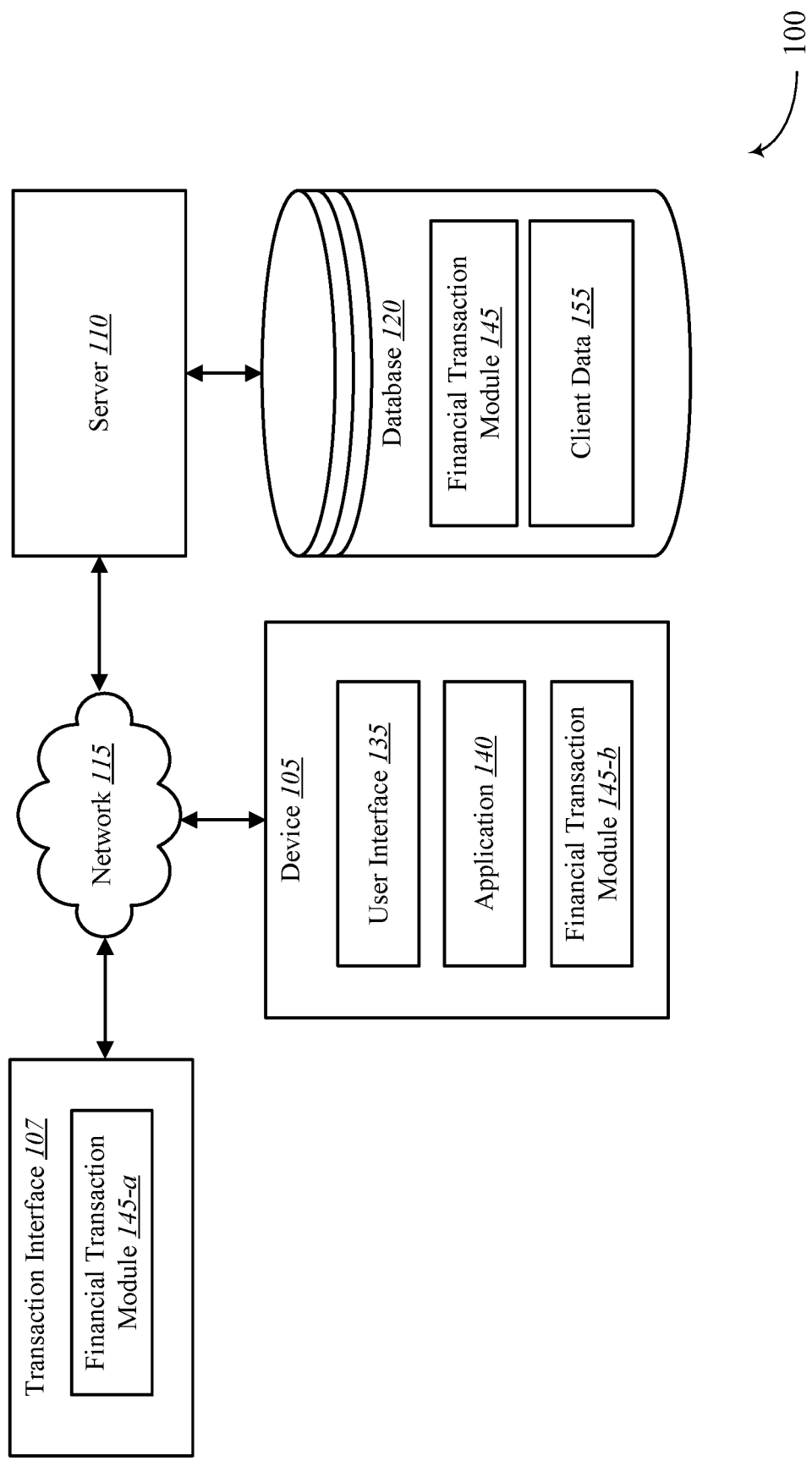
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The systems and methods described herein relate to realtime financial transaction approval. More specifically, the systems and methods described herein relate to facilitating the approval or denial of a financial transaction using two-factor authentication. Once a transaction has been approved or denied (e.g., by an administrator), a response message may be transmitted to a transaction interface associated with the transaction.

Currently parents (e.g., administrators) have somewhat limited options for controlling purchases and other financial transactions made by their children. Certain banks may approve and issue payment cards to minors, however the charging protections may be limited to basic concepts such as establishing low credit limits. In addition, some parents may allow their children to purchase items via online shopping accounts where a parent's own payment card may already be registered, such as at app-stores, online retailers, streaming game portals, media streaming portals, and similar online retail entities. In each instance, there may be little control over how the children make purchases—any unpermitted purchases may be dealt with after the fact.

In some examples, a multi-point two-factor authentication may be inserted into the transaction approval path for each charge to a payment card assigned to a child (or online account given to a child). In some examples, the two-factor authentication endpoint(s) may be off-limits to the children themselves—e.g., the endpoints may be associated (or belong to) the parent(s). Approval at a point of sale for each transaction attempted by a child may be blocked by the bank until a parent confirms it on a two-factor authentication endpoint.

In some examples, the financial institution issuing a payment card (e.g., credit card, debit card, charge card, ATM card, stored-value card, fleet card, etc.) may enhance its user interface to improve the user experience (UX) by providing the option of implementing two-factor authentication. One way of doing so may be via bank's web portal where customers go to check their balance and account statements. The setup process may guide the parent (e.g., the administrator) to install an application (such as Symantec VIP) onto their mobile device, and register the credential ID with the bank. Unlike standard two-factor identification for logins, the bank may allow the parent to install and authorize multiple applications and/or multiple application instances. Accordingly, multiple parents, grandparents, older relatives, and otherwise trusted guardians may each approve or deny children's transactions.

Once two-factor authentication is set up for transactions on a payment card, the bank may include a new extra verification step during each transaction. The new verification step may signal simultaneously all registered two-factor authentication endpoints and may not approve or decline the transaction request at the point of sale until one of the two-factor authentication endpoints responds. During signaling, the two-factor authentication endpoints may be sent information (e.g., the vendor name, merchandise description, an amount of the transaction, etc.) so that the administrator may make an informed decision about the legitimacy of the purchase. As soon as one of the two-factor authentication endpoints responds to the bank by allowing or denying the attempted transaction, then the bank's new verification step may complete and respond to the point of sale (e.g., to the transaction interface).

In some examples, a timeout for two-factor authentication may be desirable so that the point of sale is not blocked indefinitely. Additional setup for profiling a customer's purchasing patterns may be implemented. For example, based on the conditions of a given policy, a regulated account requesting to make a purchase of a few dollars at the school cafeteria during lunch time on a weekday may not trigger two-factor authentication. However, purchasing a $1000 dollar smartphone at XYZ store or at XYZ.com online store may trigger the two-factor authentication described based on stipulations of the policy.

FIG. 1 is a block diagram illustrating one embodiment of an environment 100 in which the present systems and methods may be implemented. In some embodiments, the systems and methods described herein may be performed based on the operations of a device 105 and transaction interface 107. As depicted, the environment 100 may include a device 105, a transaction interface 107, server 110, and a network 115 that allows the device 105, the transaction interface 107, the server 110, and the database 120 to communicate with one another. In other examples, the environment 100 may include a remote device (e.g., a remote computing device) in communication with device 105.

Examples of the device 105 may include any combination of mobile devices, smart phones, personal computing devices, computers, laptops, desktops, servers, media content set top boxes, or any combination thereof. In some cases, device 105 may include a financial transaction module 145-b integrated within device 105, or may be in communication with a financial transaction module via network 115. In some examples, device 105 may be in communication with a remote device (e.g., a remote computing device).

Examples of the transaction interface 107 may include any combination of mobile devices, smart phones, personal computing devices, computers, laptops, desktops, servers, media content set top boxes, or any combination thereof. In some cases, the transaction interface 107 may include a physical point of sale, an automated teller machine (ATM), or an online point of sale. The transaction interface 107 may include a financial transaction module 145-a that is configured to facilitate the approval (or denial) of a transaction made at the transaction interface 107. The financial transaction module 145-a may be integrated within the transaction interface 107, or may be in communication with a financial transaction module via network 115. In some examples, the transaction interface 107 may be in communication with the device 105 via the network 115.

Examples of a remote device (e.g., a remote computing device) may include at least one of one or more client machines, one or more mobile computing devices, one or more laptops, one or more desktops, one or more servers, one or more media set top boxes, or any combination thereof. Examples of server 110 may include any combination of a data server, a cloud server, proxy server, mail server, web server, application server, database server, communications server, file server, home server, mobile server, name server, or any combination thereof. In some examples, a remote computing device may connect to device 105 via network 115. In other examples, a remote computing device may connect directly to device 105. In some cases, device 105 may connect or attach to a remote computing device and/or server 110 via a wired and/or wireless connection. In some cases, device 105 may attach to any combination of a port, socket, and slot of device 105 and/or server 110.

In some configurations, the device 105 may include a user interface 135, application 140, and financial transaction module 145-a. Although the components of the device 105 are depicted as being internal to the device 105, it is understood that one or more of the components may be external to the device 105 and connect to device 105 through wired and/or wireless connections. In some embodiments, application 140 may be installed on a computing device (e.g., a remote computing device) in order to allow a user to interface with a function of device 105, financial transaction module 145-a, transaction interface 107, and/or server 110.

In some configurations, the transaction interface 107 may include a financial transaction module 145. Although the components of the device 105 are depicted as being internal to the device 105, it is understood that one or more of the components may be external to the device 105 and connect to device 105 through wired and/or wireless connections. In some embodiments, application 140 may be installed on a computing device (e.g., a remote computing device) in order to allow a user to interface with a function of device 105, financial transaction module 145-a, transaction interface 107, and/or server 110.

In some embodiments, device 105 and transaction interface 107 may communicate with server 110 via network 115. Examples of network 115 may include any combination of cloud networks, local area networks (LAN), wide area networks (WAN), virtual private networks (VPN), wireless networks (using 802.11, for example), cellular networks (using 3G and/or LTE, for example), etc. In some configurations, the network 115 may include the Internet. It is noted that in some embodiments, the device 105 may not include financial transaction module 145-b. For example, device 105 may include application 140 that allows device 105 to interface with a separate device via a financial transaction module being located on another device such as a remote computing device and/or server 110 (e.g., financial transaction module 145). In some embodiments, device 105, transaction interface 107, and server 110 may financial transaction module 145 where at least a portion of the functions of the financial transaction module 145 are performed separately and/or concurrently on device 105, the transaction interface 107, and/or server 110. Likewise, in some embodiments, a user may access the functions of device 105 (directly or through device 105 via user interface 135) from a remote computing device. For example, in some embodiments, a remote computing device may include a mobile application that interfaces with one or more functions of device 105, financial transaction module 145-b, and/or server 110.

In some embodiments, server 110 may be coupled to database 120. Database 120 may be internal or external to the server 110. In one example, device 105 may be coupled to database 120. For example, in one embodiment database 120 may be internally or externally connected directly to device 105. Additionally or alternatively, database 120 may be internally or externally connected directly a remote computing device and/or one or more network devices such as a gateway, switch, router, intrusion detection system, etc. Database 120 may include financial transaction module 145 and client data 155 (e.g., data associated with device 105, data associated with a user and/or administrator of the device 105, data associated with one or more transaction interface 107, etc.). In some examples, financial transaction module 145 may be located at device 105, at transaction interface 107, at database 120, or at each location and may be utilized in approving a financial transaction as described herein. As one example, device 105 (e.g., financial transaction module 145-b) may approve one or more attempted financial transactions that occur at transaction interface 107. The approval may occur, for example, over network 115 via server 110.

As described above, one or more financial transaction modules 145 may enable approving (or denying) a financial transaction. For example, a transaction may be attempted at the transaction interface 107 and, in some examples, may be approved or denied by the device 105 (e.g., via network 115, server 110, and/or database 120). In some embodiments, the financial transaction module 145 may be configured to perform the methods described herein (e.g., receiving requests, determining payment types, transmitting requests, etc.) in conjunction with the device 105 (e.g., via the user interface 135, application 140, and/or financial transaction module 145-b of the device 105). User interface 135 may enable a user to interact with, control, and/or program one or more functions of the financial transaction module 145-b. Further details regarding the financial transaction module 145-b are discussed below.

Figure 2:
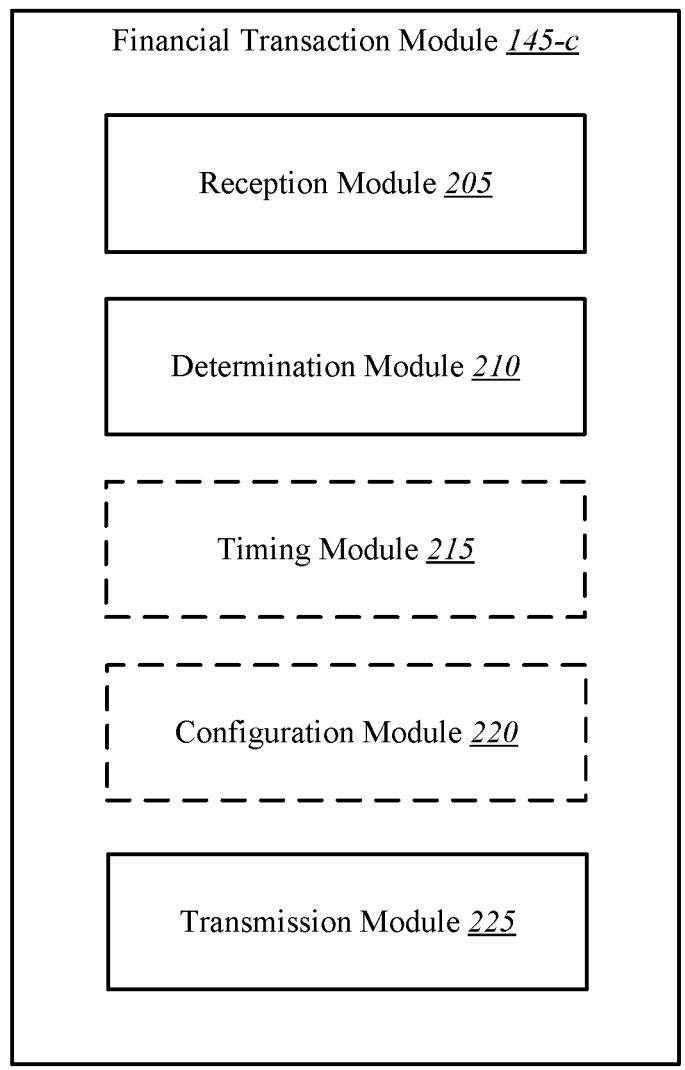
FIG. 2 is a block diagram illustrating one example of a financial transaction module.

FIG. 2 is a block diagram illustrating one example of a financial transaction module 145-c. The financial transaction module 145-c may be one example of a financial transaction module 145 depicted in FIG. 1. For example, the financial transaction module 145-c may be located in (or in communication with) a transaction interface 107, a device 105, and/or a database 120 as described with reference to FIG. 1. As depicted, financial transaction module 145-c may include reception module 205, determination module 210, and transmission module 225. In some examples, the financial transaction module 145-c may include a timing module 215 and/or a configuration module 220.

In some examples, the financial transaction module 145-c may be associated with a financial institution. For example, the financial transaction module 145-c may be associated with a server at a financial institution that is configured to process transactions made by customers. Accordingly, the processes described herein may result in a financial transaction being allowed or denied. For example, the attempted transaction may be made by a child and may be subsequently approved (or denied) by a parent (e.g., an administrator). In other examples, the attempted transaction may be made and approved by individuals that are part of a same organization, entity, family, group, or the like. In some examples, administrative privileges may be assigned based on one or more settings of a profile associated with the users.

In some examples, the reception module 205 may be configured to receive a transaction request to approve a financial transaction. For example, the reception module 205 may be configured to receive the transaction request from a transaction interface (e.g., transaction interface 107 as described with reference to FIG. 1). The transaction request may include various information associated with the transaction. For example, the request may include a time of day of the transaction, a geographical location of the transaction, a seller associated with the transaction (e.g., store name, online store name, web address, bank name, etc.), an amount of the transaction, or a combination thereof. As described herein, the information included in the received request may be provided to an administrator for their use in approving or denying the financial transaction.

The determination module 210 may determine that a payment method of the financial transaction is associated with a regulated account. As described herein, an account may include one or more users and one or more administrators. For example, an account may be associated with a family—children of the family may be classified as users (e.g., individuals whose financial transactions must be approved by an administrator) and parents of the family may be classified as administrators (e.g., individuals who may approve users' financial transactions). Accordingly, the determination module 210 may determine that the payment method used by the user is associated with a particular account. In some examples, the determination may be made based on a payment card number, a payment card type, a user profile or user account (e.g., when making purchases online), a device type (e.g., a phone associated with the user), or a combination thereof. In some examples, such identifying information (e.g., a credit card number) may be entered into a profile associated with the regulated account such that the determination module 210 may determine that the payment method is associated with the account. The determination may be made, for example, by comparing one or more characteristics of the attempted transaction with the identifying information stored to the profile associated with the regulated account.

In some examples, the determination module 210 may determine whether a predetermined condition or a set of predetermined conditions associated with the financial transaction are satisfied based on a policy associated with the regulated account. As described herein, a predetermined condition associated with the financial transaction may be or may include a time of day, a geographical location, a category of merchandise, a seller, an amount of the financial transaction, a quantity of financial transactions made or attempted in a given time period, a monetary amount of financial transactions made in a given time period, or a combination thereof. In some examples, if the predetermined condition is satisfied then the transaction may be approved without an independent authorization from an administrator. For example, a policy may specify that any transaction below a specified dollar satisfies the predetermined condition—e.g., if a transaction is below one hundred dollars ($100) then the transaction may be automatically approved. In some examples, the policy may be specified by an individual (e.g., an administrator) and may be associated with the regulated account. Additionally or alternatively, the policy may stipulate particular administrators to transmit a request to (e.g., an approval request as described herein). In some examples, the list of administrators may be updated to include new and/or different administrators. Accordingly, any one account may include one or more policies that specify whether a particular transaction may be automatically approved, automatically denied, or whether an administrator may approve or deny the transaction.

In some examples, the transmission module 225 may transmit an approval request to approve the financial transaction to a first administrator associated with the regulated account. The approval request may be transmitted to a device associated with an administrator (e.g., device 105 as described with reference to FIG. 1) and may include an option to accept the transaction or to deny the transaction. In some examples, the approval request may be received by the administrator in the form of a notification, and the notification may include details relating to the attempted transaction (e.g., the user attempting the transaction, the location of the transaction, the dollar amount of the transaction, etc.). As discussed herein, the transaction may be transmitted to the administrator based on determining that the payment method of the financial transaction is associated with the regulated account. For example, if the financial transaction is automatically accepted or automatically declined—e.g., based on it satisfying a predefined condition—then the approval request may not be transmitted to the administrator.

Additionally or alternatively, the transmission module 225 may transmit a response message to the transaction interface (e.g., the transaction interface 107 as described with reference to FIG. 1). In some examples, the transmission module 225 may transmit the response message that indicates whether the financial transaction is approved. For example, as described herein, the transmission module 225 may transmit an approval request to an administrator that may include an option to accept or deny the transaction. In the event that the approval request is transmitted to the administrator (i.e., the attempted transaction is not automatically approved or denied) then the administrator may transmit a response to the financial transaction module 154-c. The response may be received by the reception module 205 and may indicate a binary value indicating whether the administrator has approved or rejected the attempted transaction (e.g., a binary "1" indicating the transaction is approved and binary "0" indicating the transaction is denied). Accordingly, the transmission module 225 may transmit (e.g., pass on) the response received from the administrator to the transaction interface.

In some examples, the transmission module 225 may transmit the response message indicating the approval (or denial) of the financial transaction to the transaction interface without transmitting the approval request to the administrator. As described herein, the determination module 210 may determine whether a predetermined condition associated with the attempted transaction is satisfied. Accordingly, if the predetermined condition is satisfied, then the transmission module 225 may automatically indicate (to the transaction interface) that the attempted transaction has been accepted or denied. Thus, in some examples (e.g., in the event that the transaction is automatically accepted or automatically declined), the financial transaction module 145-*c* may be configured to generate a response message and transmit the response message to the transaction interface. As described herein, the response message may indicate whether the attempted transaction is approved or declined.

In some examples, the financial transaction module 145-*c* may include a timing module 215. The timing module 215 may include one or more timers (e.g., one or more clocks) that are configured to be activated based on the approval request being transmitted to the administrator (e.g., by the transmission module 225). For example, once the approval request is transmitted to the administrator, the timing module 215 may activate a timer. The timer may be a timer configured to count incrementally or, in some examples, the timer may countdown from a predefined value. In either example, the financial transaction module 145-*c* may be configured such that, after a predetermined amount of time after transmitting the approval request, the attempted financial transaction times out. If the attempted transaction times out or a timer expires then the attempted transaction may be automatically denied. In some examples, the value that the timer reaches in order for a time out to occur may be predefined and/or selected by an administrator. In some examples, if a response message is received (e.g., by the reception module 205) before the timer times out, then the attempted transaction may be approved or declined based on the administrator's selection.

In some examples, the financial transaction module 145-*c* may include a configuration module 220. The configuration module 220 may configure the transaction response message to include an indication identified in the response to the approval request (e.g., received from the administrator). For example, the response message may include a binary value that represents whether the administrator approves or denies the transaction. In some cases, the response message may include a code or sequence of characters that indicate whether the administrator approves or denies the transaction. In some examples, the configuration module 220 may pass along the response to the transmission module 225 to transmit to the transaction interface. In other examples, the configuration module 220 may format the response message based on one or more characteristics of the transaction interface (e.g., based on an operating system of the transaction interface). The configuration module 220 may be informed of the one or more characteristics of the transaction interface by, for example, the determination module 210.

In some examples, one or more modules of the financial transaction module 145-*c* may be configured to identify a subscription associated with the financial transaction. For example, the attempted financial transaction may be or may include to a service that is associated with a recurring payment (e.g., a monthly subscription to an application). Such identification may be made, for example, by the determination module 210. In some examples, identifying a subscription associated with the transaction may result in the generation of a subscription request to the administrator (e.g., a request to approve the subscription). In some examples, the approval and subscription requests may be combined into a single request to approve the financial transaction (e.g., including the subscription and/or recurring payments). In other examples, the approval and subscription requests may be transmitted to the administrator as separate requests—one request to approve the single transaction, and one request to approve the subscription and/or recurring payments. In either example, however, the transmission module 225 may transmit a single response message (e.g., to the transaction interface) that indicates whether the financial transaction and/or subscription is approved.

Additionally or alternatively, the transaction interface may request approval for a subsequent charge (e.g., a charge associated with a subscription) to be made. In some examples, the request for the subsequent payment may be or may be referred to as a subscription charge request to approve a financial transaction. As described herein, a subscription may be approved by an administrator based on him or her receiving a subscription request message. Accordingly, in some examples, if a subscription request message is approved then a subscription charge request message may be automatically approved. In other examples, a previously-approved subscription may be revoked, resulting in a response message being transmitted to the transaction interface 107-*a* to revoke the automatic (e.g., the subsequent) payment. In other examples, a response message may be transmitted to the transaction interface that automatically approves the subsequent charge associated with the transaction (e.g., without transmitting the subscription charge request to the administrator).

Figure 3:
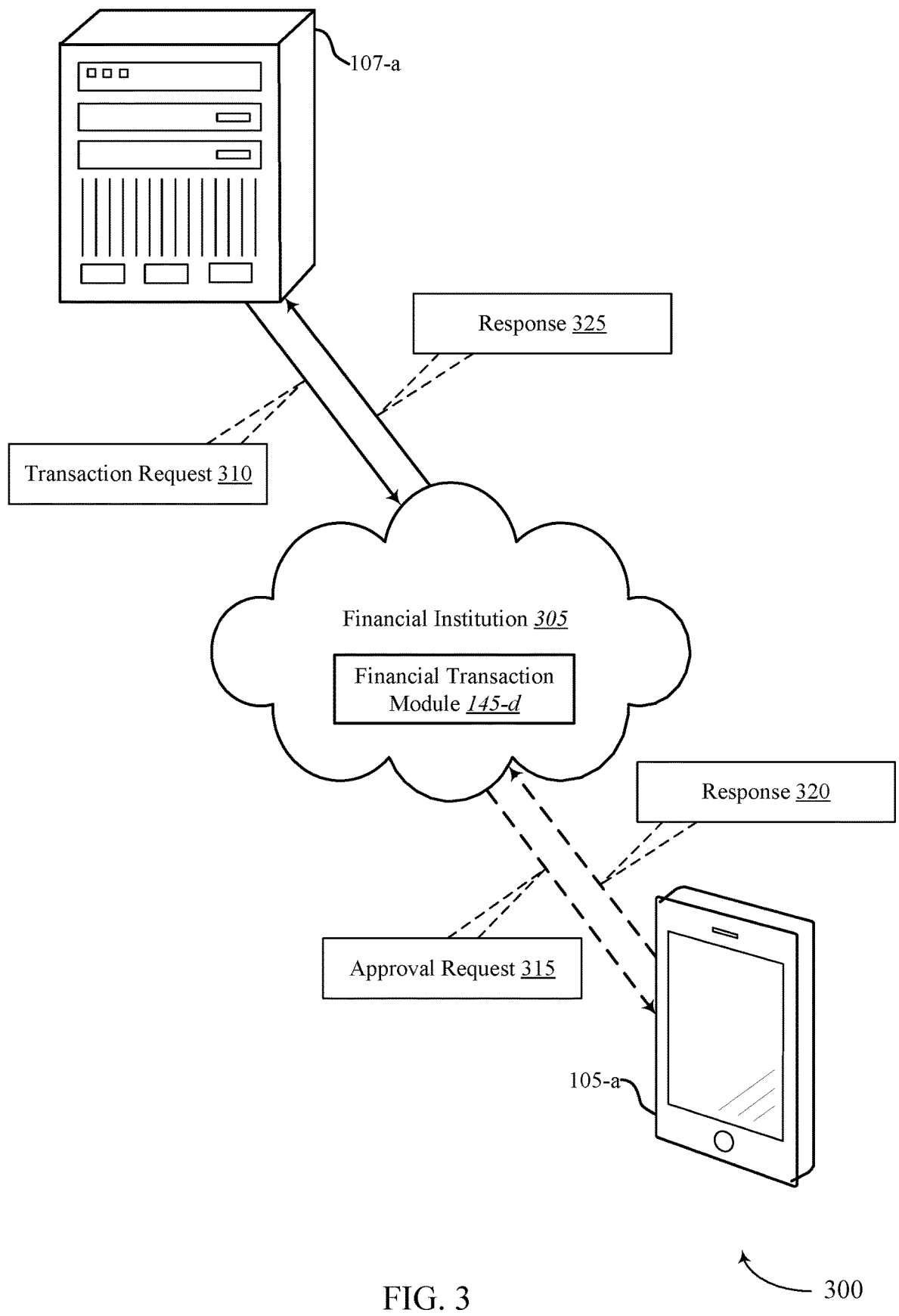
FIG. 3 is a system diagram illustrating one example of a realtime financial transaction approval in computing environments.

FIG. 3 is a system diagram illustrating a system 300 that supports realtime financial transaction approval in computing environments as described herein. In some embodiments, the systems 300 may include a financial institution 305 (e.g., a server that is associated with a financial institution 305) that is in communication with a transaction interface 107-*a* and a device 105-*a*. In some examples, the transaction interface 107-*a* and the device 105-*a* may be examples of the transaction interface 107 and device 105, respectively, as described with reference to FIG. 1. In some examples, the financial institution 305 may include a financial transaction module 145-*d*, which may be an example of the financial transaction modules 145 as discussed with reference to FIGS. 1 and 2. The financial transaction module 145-*d* may transmit and receive a transaction request 310 (e.g., a transaction request message 310), an approval request 315 (e.g., an approval request message 315), a response 320 to approval request 315 (e.g., a response message 320), and a response 325 to transaction request 310 (e.g., a response message 325). In some cases, data in at least one of transaction request 310, approval request 315, response 320, and response 325 may be encrypted.

In some examples, the system 300 may result in an approval or a denial of a financial transaction at the transaction interface 107-*a*. The transaction interface 107-*a* may be or may include a physical point of sale, an automated teller machine (ATM), or an online point of sale. Thus, a user may attempt to make a financial transaction at the transaction interface 107-*a*. For example, the transaction interface 107-*a* may be an ATM and a user may attempt to withdraw money from the ATM. Upon the user attempting the financial transaction, the transaction interface 107-*a* may transmit a transaction request 310 to the financial institution 305 (e.g., to the financial transaction module 145-*d*). In some examples, the transaction request 310 may include identifying information associated with the attempted transaction. For example, the request may include a location of the ATM, a time of the attempted transaction, the amount of the requested transaction, and/or similar identifying information. Upon receiving the transaction request 310, the financial transaction module 145-*d* may transmit an approval request 315 to the device 105-a (e.g., to an email, text message, instant message, in-application (in-app) message, etc., of an administrator associated with the device 105-a). For example, an administrator may install an application on device 105-a (e.g., application 140) and financial institution 305 may transmit the approval request 315 to device 105-a via the application installed on device 105-a (i.e., via an in-app message).

In some examples, financial institution 305 may transmit the approval request 315 to the device 105-a in certain circumstances. For example, financial institution 305 may transmit the approval request 315 to the device 105-a to seek approval (or denial) of the attempted transaction made at the transaction interface 107-a. If the approval request 315 is transmitted to the device 105-a, the request may include identifying information associated with the transaction. Using the ATM example, approval request 315 may include a location of the ATM, a bank name associated with the ATM, a time of the attempted transaction, the amount of the requested transaction, and/or similar identifying information in order to provide the user of the device 105-a (e.g., the administrator) with details of the initiated transaction. In some examples, the user may indicate (e.g., to the device 105-a) whether he or she approves or denies the transaction. This information may be transmitted back to the financial transaction module 145-d in the form of the response message 320. In some examples, a subsequent response message 325 may be transmitted to the transaction interface 107-a whether the transaction has been approved or denied. For example, the administrator may approve an ATM transaction made at the transaction interface 107-a and, based on the approval, a user of the transaction interface 107-a may receive the money he or she requested.

In some examples, the system 300 may include multiple devices 105-a and/or multiple administrators. For example, the system 300 may support the approval of financial transactions may be by individuals who are part of a same organization, entity, family, group, or the like. In some examples, administrative privileges may be assigned based on one or more settings of a profile associated with the users. Accordingly, multiple administrators may be assigned to a same group (e.g., a same family, organization, etc.). Thus, the approval request 315 may be transmitted to multiple devices (e.g., devices 105-a). In such an example, the attempted transaction may be approved based on the financial transaction module 145-d receiving at least one indication of approval (e.g., in the response message 320). In other examples, the attempted transaction may be rejected based on the financial transaction module 145-d receiving at least one indication of denial (e.g., in the response message 320).

Additionally or alternatively, one or more temporary administrators may be assigned. For example, an administrator may be temporarily unavailable (e.g., he or she may be out of town). Accordingly, temporary administrative privileges may be assigned to a second administrator for a predefined period of time. During this time, the administrator may receive an approval request 315 (e.g., to approve or deny a transaction). Upon the expiration of the predefined period of time, the temporary administrator may have his or her administrative privileges revoked and the approval requests may resume being transmitted to the original administrator. Additionally or alternatively, different administrators associated with a policy may be assigned priorities. For example, a first administrator may be associated with a higher priority than a second administrator. Accordingly, a response received from a first administrator may always be relayed to the transaction interface 107-a over a response received from a second administrator.

In some examples, the approval request 315 may not be transmitted to the device 105-a and, in turn, the response message 320 may not be transmitted to the financial institution 305 (e.g., to the financial transaction module 145-d). For example, if a predetermined condition or a set of predetermined conditions associated with the financial transaction are satisfied then the transaction may be automatically approved without seeking approval from an administrator. As described herein, a predetermined condition associated with the financial transaction may be or may include a time of day, a geographical location, a category of merchandise, a seller, an amount of the financial transaction, a quantity of financial transactions made or attempted in a given time period, a monetary amount of financial transactions made in a given time period, or a combination thereof. Thus, if the predetermined condition is satisfied then the transaction may be approved without an independent authorization from an administrator (e.g., and the approval request 315 may not be sent to the device 105-a). In some examples, the policy may be specified by an individual (e.g., an administrator using device 105-a) and may be associated with the regulated account. Accordingly, any one account may include one or more policies that specify whether a particular transaction may be automatically approved, automatically denied, or whether an administrator may approve or deny the transaction.

Figure 4:
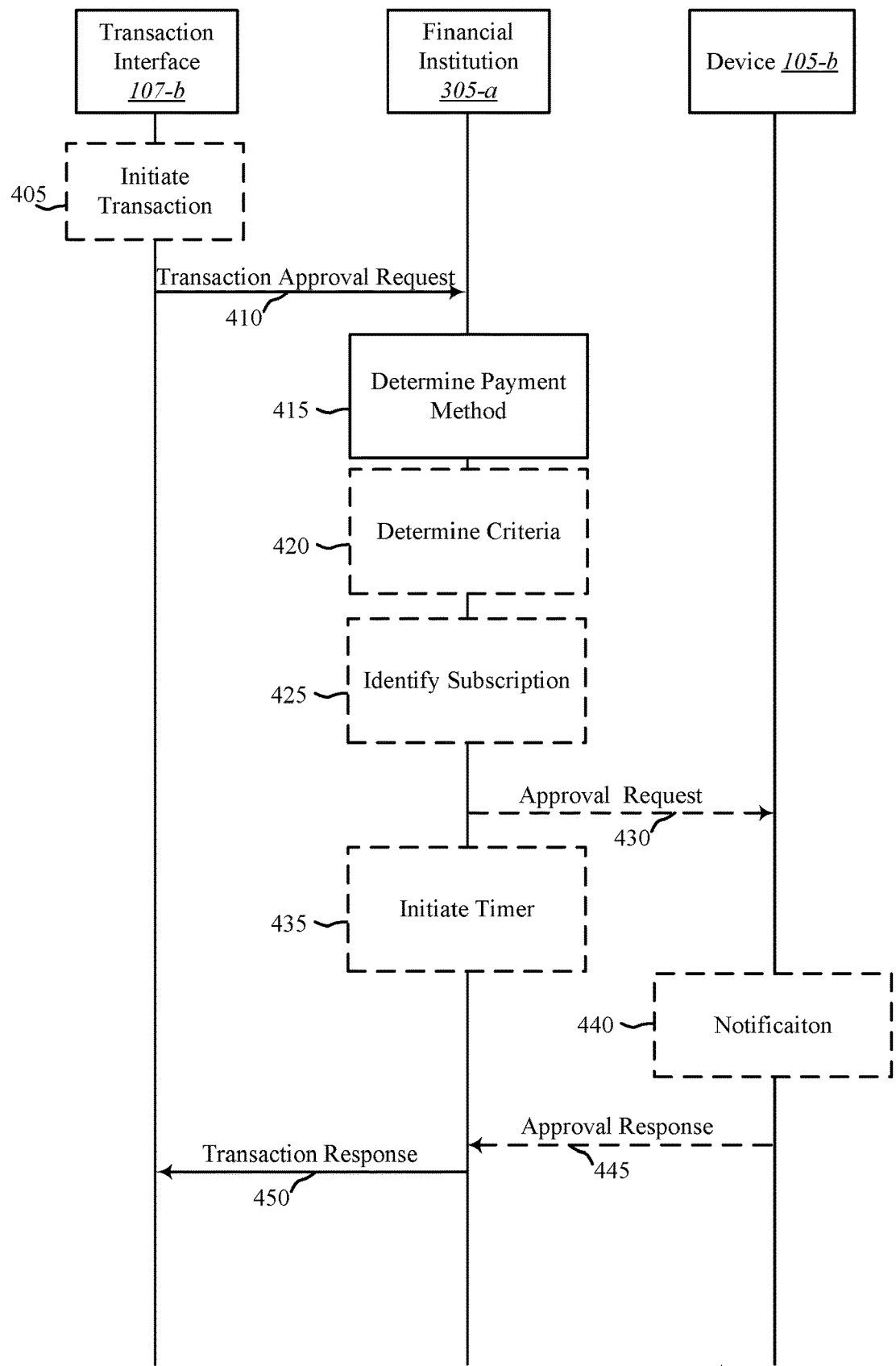
FIG. 4 is a swim diagram that supports realtime financial transaction approval in computing environments.

FIG. 4 is a swim diagram 400 that supports realtime financial transaction approval in computing environments as described herein. In some examples, swim diagram 400 may implement aspects of environment 100 and/or system 300. In some configurations, the diagram 400 may be associated with a transaction interface 107-b, a financial institution 305-a, and a device 105-b. In some examples, the transaction interface 107-b may be an example of the transaction interface 107 as described with reference to FIGS. 1 and 3, the financial institution 305 may be an example of the financial institution 305 as described with reference to FIG. 3, and the device 105-b may be an example of the device 105 as described with reference to FIGS. 1 and 3. In some examples, the financial institution 305-a may include or may be associated with a financial transaction module 145 as described with reference to FIGS. 1 through 3.

In some configurations, the steps depicted by the swim diagram 400 may be implemented in conjunction with server 110, network 115, components thereof, or any combination thereof. In some cases, aspects of diagram 400 may be implemented by and/or in conjunction with a financial transaction module 145. In some examples, device 105-a may be referred to as a user device and may be associated with a user seeking to approve (or deny) a financial transaction.

At block 405, a user or machine may initiate a transaction at the transaction interface 107-b. As discussed herein, the transaction interface 107-b may be or may be associated with a physical point of sale, an ATM, or an online point of sale, etc. Accordingly, a transaction may include purchasing goods or services at a physical store (e.g., using a bank card), attempting to withdraw money or make a deposit at an ATM, and/or purchasing goods or services through an online merchant (e.g., using a bank card). In some examples, the transaction may be made by an individual (e.g., a user) associated with an account (e.g., a profile) for approving financial transactions. In some examples, the account may include one or more users and one or more administrators.

As discussed herein, an administrator may approve (or decline) a requested transaction.

At 410, transaction interface 107-*b* may transmit a transaction request to the financial institution 305-*a*. In some examples, the transaction request may be transmitted based on the transaction. The transaction request may include various information associated with the transaction. For example, the request may include a time of day of the transaction, a geographical location of the transaction, a seller associated with the transaction, an amount of the transaction, or a combination thereof. As described herein, the information included in the received request may be provided to an administrator for their use in approving or denying the financial transaction.

At block 415, the financial institution 305-*a* may determine a payment method associated with the transaction. The determination may be whether the payment method of the financial transaction is associated with a regulated account. For example, a regulated account may be associated with a business organization—subordinate employees may be classified as users (e.g., individuals whose financial transactions must be approved by an administrator) and managers of the organization may be classified as administrators (e.g., individuals who may approve users' financial transactions). In some examples, the determination may be made based on a payment card number, a payment card type, a user profile or user account (e.g., when making purchases online), a device type (e.g., a phone associated with the user), or a combination thereof. The determination may be made, for example, by comparing one or more characteristics of the transaction with the identifying information stored to the profile associated with the regulated account.

At block 420, financial institution 305-*a* may identify one or more predetermined conditions associated with the transaction initiated at 405. In some examples, a predetermined condition associated with the financial transaction may be or may include a time of day, a geographical location, a category of merchandise, a seller, an amount of the financial transaction, a quantity of financial transactions made or attempted in a given time period, a monetary amount of financial transactions made in a given time period, or a combination thereof. In some examples, if the predetermined condition is satisfied then the transaction may be approved without an independent authorization from an administrator.

At block 425, financial institution 305-*a* may identify a subscription associated with the transaction. In some examples, the financial transaction may be or may include to a service that is associated with a recurring payment. For example, the transaction may be associated with a recurring payment for a mobile application, a membership, or other various goods or services. In some examples, the determination of whether the transaction is a subscription may be made based on identifying information (e.g., metadata) included in the transaction request 410.

At 430, financial institution 305-*a* may transmit an approval request to the device 105-*b* (e.g., to a first administrator associated with the regulated account). In some examples, the approval request may include an option to accept the transaction or to deny the transaction. In some examples, the approval request may be received by the administrator in the form of a notification, and the notification may include details relating to the transaction (e.g., the user attempting the transaction, the location of the transaction, the dollar amount of the transaction, etc.). As discussed herein, the transaction may be transmitted to the administrator based on determining that one or more predetermined conditions associated with the transaction are satisfied. For example, if the predetermined condition is satisfied then the approval request 430 may not be transmitted to the device 105-*b*. Instead, the financial transaction may be automatically accepted (or automatically denied if the predetermined condition is not satisfied).

At block 435, financial institution 305-*a* may initiate a timer based on the approval request being transmitted to the device 105-*b*. In some examples, the timer may be configured to count incrementally or, in some examples, the timer may be a countdown timer that counts down from a predefined value (e.g., count down from 30 seconds). In either example, after a predetermined amount of time from transmitting the approval request lapses, financial institution 305-*a* may determine that the financial transaction times out. If the transaction initiated at 405 times out (e.g., the timer reaches a predetermined value) then the transaction may be automatically rejected (e.g., the transaction response at 450 may be automatically transmitted to the transaction interface 107-*b*). In some examples, the value that the timer reaches in order for a time out to occur may be predefined and/or selected by an administrator, the financial institution 305-*a*, etc. In some examples, when financial institution 305-*a* receives the approval response message at 445 before the timer times out, then the transaction may be approved or declined based on the indication included in the approval response message.

At block 440, the device 105-*b* may receive the approval request 430. In some examples, the device 105-*b* may receive the approval request in the form of a notification. For example, the notification may alert the administrator of the financial transaction and may include identifying information associated with the transaction (e.g., a location of the transaction, a monetary amount of the transaction, etc.). In some examples, the notification may also give the administrator an option to allow the transaction or to deny the transaction. Based on the administrator's selection, the transaction may be approved or denied.

At 445, device 105-*b* may transmit an approval response to financial institution 305-*a*. In some examples, the first response message may include an indication of whether the administrator approved or denied the financial transaction. In some examples, the approval request may request that the administrator approve a current transaction (e.g., a transaction initiated at block 405). Additionally or alternatively, the approval request may request that the administrator approve a current transaction and concurrently may also request that the administrator confirm automatic approval for all future transactions for the same item or service. For example, the approval request may request that the administrator approve all future transactions associated with a subscription such as a streaming television series, recurring mobile application charges, etc. In other examples, the approval request may request that the administrator approve the single transaction and may also request confirmation whether all future transactions associated with the same category (e.g., clothing, school supplies, food, recreation center, movie theater, internet café, gaming café, library, etc.), from the same merchant and/or from the same location are approved (e.g., same physical store, same online store, same ATM, same bank, etc.). For example, the approval request may approve all future transactions associated with XYZ store or at XYZ-.com, etc.

Additionally or alternatively, the device 105-*b* may transmit an approval response that denies the transaction (e.g., the transaction initiated at block 405). The approval response may deny the current transaction or, in some examples, may deny the single transaction and automatically decline all future transactions associated with a same category, from a same merchant, or from a same location. In some cases, the approval response may approve the current transaction, but provide an automatic denial on all future transactions. In other examples, the approval message may indicate a fraudulent transaction based on a user of device 105-*b* indicating that the transaction may be fraudulent. In the examples described herein, the various options associated with the information provided in the approval response (e.g., approve/deny single transactions, approve/deny automatic future transactions, etc.) may be saved to the associated policy and/or may be stored at one or more servers associated with the financial institution 305-*a*.

At 450, the financial institution 305-*a* may transmit a second response message to the transaction interface 107-*b*. In some examples, the second response message may include an indication of whether the transaction has been approved or denied. For example, the administrator may approve a transaction made at the transaction interface 107-*b* and, based on the approval, a user of the transaction interface 107-*b* may proceed with his or her financial transaction.

Figure 5:
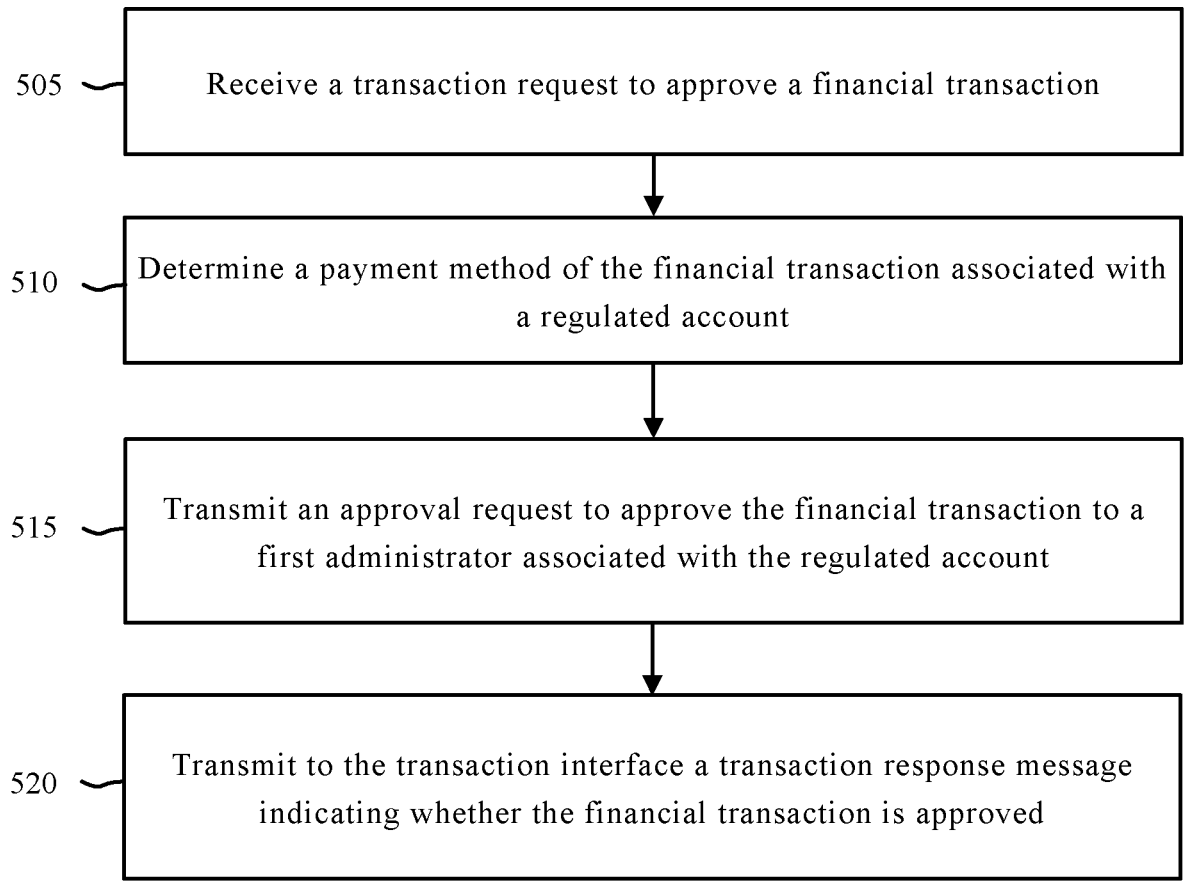
FIG. 5 is a flow diagram illustrating one embodiment of a method in accordance with various aspects of this disclosure.

FIG. 5 is a flow diagram illustrating one embodiment of a method 500 for realtime financial transaction approval in computing environments. In some configurations, the method 500 may be implemented by the financial transaction module 145 illustrated in FIG. 1 or 2. In some configurations, the method 500 may be implemented in conjunction with device 105, transaction interface 107, server 110, network 115, database 120, components thereof, or any combination thereof.

At block 505, the method 500 may include receiving, from a transaction interface, a transaction request to approve a financial transaction. At block 510, the method 500 may include determining a payment method of the financial transaction is associated with a regulated account. At block 515, the method 500 may include transmitting, based at least in part on the determining the payment method of the financial transaction is associated with the regulated account, an approval request to approve the financial transaction to a first administrator associated with the regulated account. At block 520, upon receiving a response to the approval request, the method 500 may include transmitting to the transaction interface a transaction response message indicating whether the financial transaction is approved.

Figure 6:
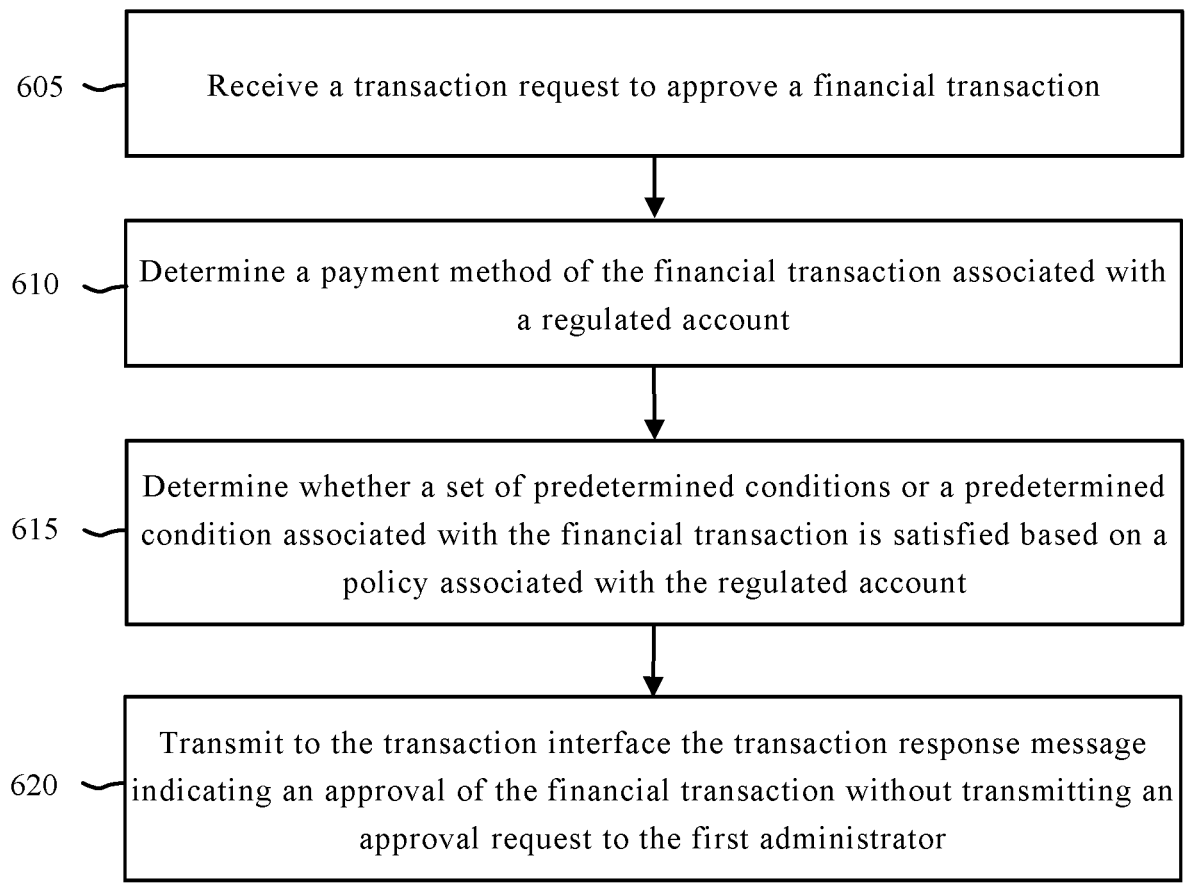
FIG. 6 is a flow diagram illustrating one embodiment of a method in accordance with various aspects of this disclosure.

FIG. 6 is a flow diagram illustrating one embodiment of a method 600 for realtime financial transaction approval in computing environments. In some configurations, the method 600 may be implemented by financial transaction module 145 illustrated in FIG. 1 or 2. In some configurations, the method 600 may be implemented in conjunction with device 105, transaction interface 107, server 110, network 115, database 120, components thereof, or any combination thereof.

At block 605, the method 600 may include receiving, from a transaction interface, a transaction request to approve a financial transaction. At block 610, the method 600 may include determining a payment method of the financial transaction is associated with a regulated account. At block 615, the method 600 may include determining whether a predetermined condition or a set of predetermined conditions associated with the financial transaction are satisfied based at least in part on a policy associated with the regulated account that stipulates the conditions for financial transactions (e.g., one or more predetermined conditions). At block 620, the method 600 may include, upon determining that the predetermined condition or the set of predetermined conditions associated with the financial transaction are satisfied, transmitting to the transaction interface the transaction response message indicating an approval of the financial transaction without transmitting the approval request to the first administrator.

Figure 7:
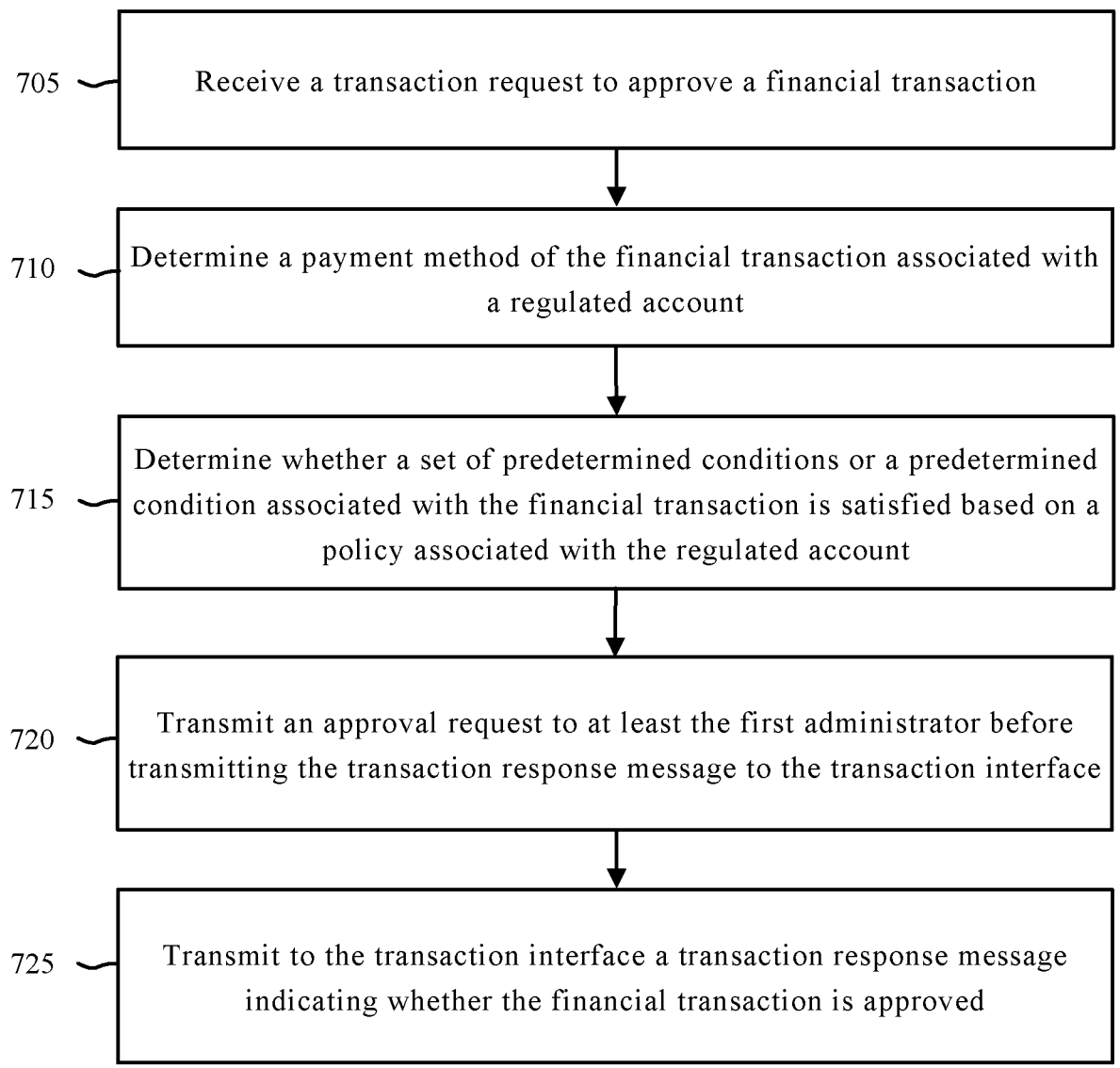
FIG. 7 is a flow diagram illustrating one embodiment of a method in accordance with various aspects of this disclosure.

FIG. 7 is a flow diagram illustrating one embodiment of a method 700 for realtime financial transaction approval in computing environments. In some configurations, the method 700 may be implemented by financial transaction module 145 illustrated in FIG. 1 or 2. In some configurations, the method 600 may be implemented in conjunction with device 105, transaction interface 107, server 110, network 115, database 120, components thereof, or any combination thereof.

At block 705, the method 700 may include receiving, from a transaction interface, a transaction request to approve a financial transaction. At block 710, the method 700 may include determining a payment method of the financial transaction is associated with a regulated account. At block 715, the method 700 may include determining whether a predetermined condition or a set of predetermined conditions associated with the financial transaction are satisfied based at least in part on a policy associated with the regulated account. At block 720, the method 600 may include, upon determining that the predetermined condition or the set of predetermined conditions associated with the financial transaction are not satisfied, transmitting the approval request to at least the first administrator before transmitting the transaction response message to the transaction interface. At block 725, the method 700 may include upon receiving a response to the approval request, transmitting to the transaction interface a transaction response message indicating whether the financial transaction is approved.

In some examples, the method 500 as described with reference to FIG. 5, the method 600 as described with reference to FIG. 6, and/or the method 700 as described with reference to FIG. 7 may include determining whether a predetermined condition or a set of predetermined conditions associated with the financial transaction are satisfied based at least in part on a policy associated with the regulated account and upon determining that the predetermined condition or the set of predetermined conditions associated with the financial transaction are satisfied, transmitting to the transaction interface the transaction response message indicating an approval of the financial transaction without transmitting the approval request to the first administrator. In some examples, the method may include upon determining that the predetermined condition or the set of predetermined conditions associated with the financial transaction are not satisfied, transmitting the approval request to at least the first administrator before transmitting the transaction response message to the transaction interface. In some examples, the predetermined condition or the set of predetermined conditions comprise at least one of a time of day, a geographical location, a category of merchandise, a seller, an amount of the financial transaction, a quantity of financial transactions made or attempted in a given time period, a monetary amount of financial transactions made in a given time period, or a combination thereof.

In some examples, the method 500 as described with reference to FIG. 5, the method 600 as described with reference to FIG. 6, and/or the method 700 as described with reference to FIG. 7 may include sending the approval request to a second administrator and initiating a timer upon transmitting the approval request. In some examples, the method may include upon determining the response to the approval request is received from the first administrator or the second administrator within a predetermined amount of time of transmitting the approval request, configuring the transaction response message to include an indication identified in the response to the approval request, wherein the indication in the response to the approval request indicates an approval or denial of the financial transaction. In some examples, the method may include upon determining no response is received from the first administrator or the second administrator within the predetermined amount of time, transmitting to the transaction interface the transaction response message indicating a denial of the financial transaction.

In some examples, the method 500 as described with reference to FIG. 5, the method 600 as described with reference to FIG. 6, and/or the method 700 as described with reference to FIG. 7 may include identifying a subscription associated with the financial transaction and combining a subscription request with the approval request to request approval of a plurality of subsequent charges associated with the financial transaction. In some examples, the method may include receiving a response message from the first administrator that includes an approval of the financial transaction and an approval of the plurality of subsequent charges associated with the financial transaction. In some examples, the method may include receiving a subscription charge request from the transaction interface to approve a subsequent charge from the plurality of subsequent charges and automatically approving the subscription charge request based at least in part on approval of the plurality of subsequent charges associated with the subscription. In some examples, the transaction interface includes a physical point of sale, an automated teller machine (ATM), or an online point of sale.

Figure 8:
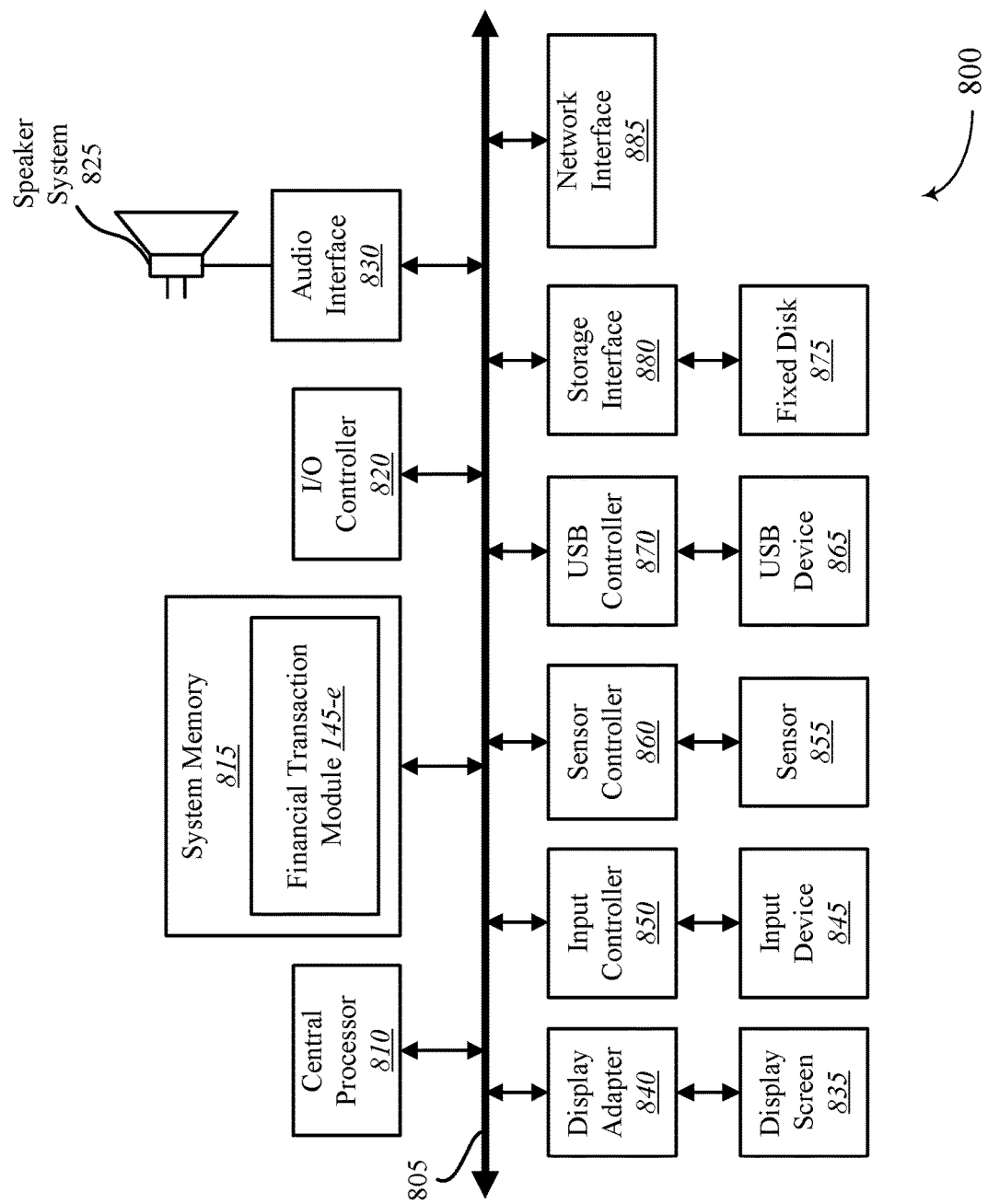
FIG. 8 depicts a block diagram of a computer system suitable for implementing the present systems and methods.

FIG. 8 depicts a block diagram of a computing device 800 suitable for implementing the present systems and methods. The computing device 800 may be an example of device 105 and/or server 110 illustrated in FIG. 1. In one configuration, computing device 800 includes a bus 805 which interconnects major subsystems of computing device 800, such as a central processor 810, a system memory 815 (typically RAM, but which may also include ROM, flash RAM, or the like), an input/output controller 820, an external audio device, such as a speaker system 825 via an audio output interface 830, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 810 and system memory 815, which may include read-only memory (ROM) or flash memory (neither shown), and random access memory (RAM), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, financial transaction module 145-e may implement the present systems and methods, which may be stored within the system memory 815. Applications (e.g., application 140) resident with computing device 800 are generally stored on and accessed via a non-transitory computer readable medium, such as a hard disk drive (e.g., fixed disk drive 875) or other storage medium. Additionally, applications can be in the form of electronic signals modulated in accordance with the application and data communication technology when accessed via network interface 885.

Storage interface 880, as with the other storage interfaces of computing device 800, can connect to a standard computer readable medium for storage and/or retrieval of information, such as a fixed disk drive 875. Fixed disk drive 875 may be a part of computing device 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to computing device 800 wirelessly via network interface 885.

Many other devices and/or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 815 or fixed disk drive 875. The operating system provided on computing device 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The signals associated with computing device 800 may include wireless communication signals such as radio frequency, electromagnetics, local area network (LAN), wide area network (WAN), virtual private network (VPN), wireless network (using 802.11, for example), cellular network (using 3G and/or LTE, for example), and/or other signals.

The network interface 885 may enable one or more of WWAN (GSM, CDMA, and WCDMA), WLAN (including BLUETOOTH® and Wi-Fi), WMAN (WiMAX) for mobile communications, antennas for Wireless Personal Area Network (WPAN) applications (including RFID and UWB), etc.

The I/O controller 820 may operate in conjunction with network interface 885 and/or storage interface 880. The network interface 885 may enable computing device 800 with the ability to communicate with client devices (e.g., device 105 of FIG. 1), and/or other devices over the network 115 of FIG. 1. Network interface 885 may provide wired and/or wireless network connections. In some cases, network interface 885 may include an Ethernet adapter or Fibre Channel adapter. Storage interface 880 may enable computing device 800 to access one or more data storage devices. The one or more data storage devices may include two or more data tiers each. The storage interface 880 may include one or more of an Ethernet adapter, a Fibre Channel adapter, Fibre Channel Protocol (FCP) adapter, a SCSI adapter, and iSCSI protocol adapter.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

As used herein, the term "security action" may refer to any number of actions the systems described herein may take after determining that a file likely includes some type of malware. For example, types of security actions may include preventing the file from performing any actions on the computing device, alerting an administrator to the potential maliciousness of the file, quarantine the file, delete the file, block a download of the file, and/or warn a user about the file. In addition, the systems described herein may perform a security action on objects other than a file. For example, the systems described herein may blacklist malicious URLs and/or IP addresses. Thus, the security actions in conjunction with the methods and systems described herein may improve the security and operating integrity of one or more computing devices by protecting the hardware, firmware, software, or any combination thereof of the one or more computing devices from malicious attack. It should be appreciated that these are not exhaustive lists of the types of security actions which may be performed by the systems described herein. Other security actions are also included in this disclosure.

What is claimed is:

1. A method for approving financial transactions, at least a portion of the method being performed by one or more computing devices, each comprising at least one processor, the method comprising:
   receiving, from a transaction interface, a transaction request to approve a financial transaction;
   determining a payment method of the financial transaction is associated with a regulated account;
   transmitting, based at least in part on the determining the payment method of the financial transaction is associated with the regulated account, an approval request for approving the financial transaction to a first administrator associated with the regulated account;
   transmitting, based at least in part on transmitting the approval request to the first administrator, the approval request for approving the financial transaction to a second administrator associated with the regulated account, wherein the first administrator and the second administrator are different from a user associated with the regulated account and wherein the first administrator is different from the second administrator;
   receiving, from the first administrator, the second administrator, or both, at least one response to the approval request transmitted to the first administrator and transmitted to the second administrator; and
   upon receiving the at least one response to the approval request from the first administrator, the second administrator, or both, transmitting to the transaction interface a transaction response message indicating whether the financial transaction is approved.

2. The method of claim 1, further comprising:
   determining whether a predetermined condition or a set of predetermined conditions associated with the financial transaction are satisfied based at least in part on a policy associated with the regulated account; and
   upon determining that the predetermined condition or the set of predetermined conditions associated with the financial transaction are satisfied, transmitting to the transaction interface the transaction response message indicating an approval of the financial transaction without transmitting the approval request to the first administrator.

3. The method of claim 2, further comprising:
upon determining that the predetermined condition or the set of predetermined conditions associated with the financial transaction are not satisfied, transmitting the approval request to at least the first administrator before transmitting the transaction response message to the transaction interface.

4. The method of claim 2, wherein the predetermined condition or the set of predetermined conditions comprises at least one of a time of day, a geographical location, a category of merchandise, a seller, an amount of the financial transaction, a quantity of financial transactions made or attempted in a given time period, a monetary amount of financial transactions made in a given time period, or a combination thereof.

5. The method of claim 1, further comprising:
initiating a timer upon transmitting the approval request.

6. The method of claim 5, further comprising:
upon determining the at least one response to the approval request is received from the first administrator or the second administrator within a predetermined amount of time of transmitting the approval request, configuring the transaction response message to include an indication identified in the at least one response to the approval request, wherein the indication in the at least one response to the approval request indicates an approval or denial of the financial transaction.

7. The method of claim 5, further comprising:
upon determining no response is received from the first administrator or the second administrator within a predetermined amount of time, transmitting to the transaction interface the transaction response message indicating a denial of the financial transaction.

8. The method of claim 1, further comprising:
identifying a subscription associated with the financial transaction; and
combining a subscription request with the approval request to request approval of a plurality of subsequent charges associated with the financial transaction.

9. The method of claim 8, further comprising:
receiving a response message from the first administrator that includes an approval of the financial transaction and an approval of the plurality of subsequent charges associated with the financial transaction.

10. The method of claim 9, further comprising:
receiving a subscription charge request from the transaction interface to approve a subsequent charge from the plurality of subsequent charges; and
automatically approving the subscription charge request based at least in part on approval of the plurality of subsequent charges associated with the subscription.

11. The method of claim 1, wherein the transaction interface includes a physical point of sale, an automated teller machine (ATM), or an online point of sale.

12. A computing device configured for approving financial transactions, comprising:
a processor; and
memory in electronic communication with the processor, wherein the memory stores computer executable instructions that when executed by the processor cause the processor to perform the steps of:
receive, from a transaction interface, a transaction request to approve a financial transaction;
determine a payment method of the financial transaction is associated with a regulated account;
transmit, based at least in part on the determining the payment method of the financial transaction is associated with the regulated account, an approval request for approving the financial transaction to a first administrator associated with the regulated account;
transmitting, based at least in part on transmitting the approval request to the first administrator, the approval request for approving the financial transaction to a second administrator associated with the regulated account, wherein the first administrator and the second administrator are different from a user associated with the regulated account and wherein the first administrator is different from the second administrator;
receive, from the first administrator, the second administrator, or both, at least one response to the approval request transmitted to the first administrator and transmitted to the second administrator; and
upon receiving the at least one response to the approval request from the first administrator, the second administrator, or both, transmit to the transaction interface a transaction response message indicating whether the financial transaction is approved.

13. The computing device of claim 12, wherein the instructions are executable by the processor to:
determine whether a set of predetermined conditions or a predetermined condition associated with the financial transaction are satisfied based at least in part on a policy associated with the regulated account; and
upon determining that the predetermined condition or the set of predetermined conditions associated with the financial transaction are satisfied, transmit to the transaction interface the transaction response message indicating an approval of the financial transaction without transmitting the approval request to the first administrator.

14. The computing device of claim 13, wherein the instructions are executable by the processor to:
upon determining that the predetermined condition or the set of predetermined conditions associated with the financial transaction are not satisfied, transmit the approval request to at least the first administrator before transmitting the transaction response message to the transaction interface.

15. The computing device of claim 13, wherein the predetermined condition or the set of predetermined conditions comprises at least one of a time of day, a geographical location, a category of merchandise, a seller, an amount of the financial transaction, a quantity of financial transactions made or attempted in a given time period, a monetary amount of financial transactions made in a given time period, or a combination thereof.

16. The computing device of claim 12, wherein the instructions are executable by the processor to:
initiate a timer upon transmitting the approval request.

17. The computing device of claim 16, wherein the instructions are executable by the processor to:
upon determining the at least one response to the approval request is received from the first administrator or the second administrator within a predetermined amount of time of transmitting the approval request, configure the transaction response message to include an indication identified in the at least one response to the approval request, wherein the indication in the at least one response to the approval request indicates an approval or denial of the financial transaction.

18. The computing device of claim 16, wherein the instructions are executable by the processor to:
upon determining no response is received from the first administrator or the second administrator within a predetermined amount of time, transmit to the transaction interface the transaction response message indicating a denial of the financial transaction.

19. The computing device of claim 12, wherein the instructions are executable by the processor to:
identify a subscription associated with the financial transaction; and
combine a subscription request with the approval request to request approval of a plurality of subsequent charges associated with the financial transaction.

20. A non-transitory computer-readable storage medium storing computer executable instructions that when executed by a processor cause the processor to perform the steps of:
receiving, from a transaction interface, a transaction request to approve a financial transaction;
determining a payment method of the financial transaction is associated with a regulated account;
transmit, based at least in part on the determining the payment method of the financial transaction is associated with the regulated account, an approval request for approving the financial transaction to a first administrator associated with the regulated account;
transmitting, based at least in part on transmitting the approval request to the first administrator, the approval request for approving the financial transaction to a second administrator associated with the regulated account, wherein the first administrator and the second administrator are different from a user associated with the regulated account and wherein the first administrator is different from the second administrator;
receive, from the first administrator, the second administrator, or both, at least one response to the approval request transmitted to the first administrator and transmitted to the second administrator; and
upon receiving the at least one response to the approval request from the first administrator, the second administrator, or both, transmit to the transaction interface a transaction response message indicating whether the financial transaction is approved.

* * * * *